United States Patent Office 3,075,976
Patented Jan. 29, 1963

3,075,976
PHENTHIAZINE DERIVATIVES
Robert Michel Jacob, Ablon-sur-Seine, and Jacques Georges Robert, Gentilly, France, assignors to Societe des Usines Chimiques Rhone-Poulenc, Paris, France, a French body
No Drawing. Filed Oct. 17, 1958, Ser. No. 767,797
Claims priority, application France Oct. 21, 1957
1 Claim. (Cl. 260—243)

This invention relates to new derivatives of phenthiazine and to processes for their preparation.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substiuted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which posses unexpectedly useful pharmacological properties. It is a further object of the invention to provide processes for the production of these new compounds.

The phenthiazine derivatives of the present invention are those which conform to the general formula:

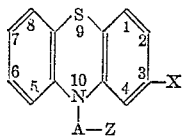

(I)

and their acid addition and quaternary ammonium salts, wherein A represents a —(CH$_2$)$_3$— group or a

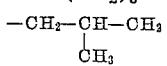

group, X represents a lower alkyl, alkoxy, acyl or alkoxycarbonyl group or a cyano, methylthio, methanesulphonyl, trifluoromethyl or dimethylsulphamoyl group, and Z represents a pyrrolidino or piperidino group substituted by a hydroxy, hydroxyalkyl or hydroxyalkoxyalkyl group or by a functional derivative of such a group, for example, an ester or carbamate group.

The groups Z are for example of the type:

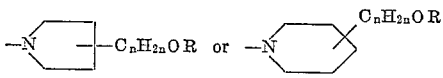

In these formulae $n=0$, 1, 2 or 3 and R represents a hydrogen atom or an acyl, carbamoyl, hydroxyalkyl, acyloxyalkyl, or carbamoyloxyalkyl group. The carbamoyl group may, if desired, be substituted on the nitrogen atom and may thus be in the form of a group such as monomethylcarbamoyl, dimethylcarbamoyl, monoethylcarbamoyl, diethylcarbamoyl, pyrrolidinocarbonyl, piperidinocarbonyl, or morpholinocarbonyl.

The word "lower" as herein applied to alkyl, alkoxy, acyl and alkoxycarbonyl groups means that the group in question contains not more than four carbon atoms.

According to a feature of the present invention, these new phenthiazine compounds are prepared by reacting a phenthiazine derivative of the general formula:

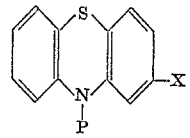

(II)

with a compound Q, the group P and the compound Q being such that Q will react with the phenthiazine derivative so as to introduce or form in the 10-position of the ring a substituent grouping of the structure:

wherein Z, X and A are as hereinbefore defined.

Preferred processes of manufacture are as follows:

(1) Interaction of a phenthiazine derivative of the general formula:

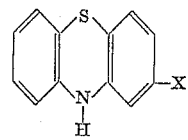

(IV)

(wherein X is as hereinbefore defined) with a compound of the general formula:

(wherein Y represents the acid residue of a reactive ester, such as a halogen atom or a sulphonic or sulphuric ester residue, and the other symbols are as hereinbefore defined).

(2) Interaction of a phenthiazine derivative of the general formula:

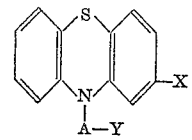

(VI)

with a compound of the general formula:

the various symbols being as hereinbefore defined.

The aforesaid reactions are carried out with or without a solvent in the presence or absence of an alkaline condensing agent, and optionally at an elevated temperature. The preferred condensing agents are alkali metals and their amides or hydrides. When the substituent R of the group Z represents a hydrogen atom it is particularly advantageous to use the corresponding tetrahydropyranyl derivative which is subsequently decomposed. When X is an acyl group it is generally advantageous to protect this group, for example by the formation of an anil or ketal.

The compounds where R represents an acyl or carbamoyl group may be prepared from those in which R represents a hydrogen atom by conversion of the hydroxyl group by known methods of esterification or formation of a urethane. Among the latter the most advantageous comprises reaction with isocyanic acid, an alkyl isocyanate, a carbamyl halide, a bromoamide, or phosgene together with ammonia or a primary or secondary amine.

The new phenthiazine derivatives according to the invention have interesting pharmacodynamic properties and they are in particular very active as sedatives and antiemetics and in some cases also have a useful degree of analgesic activity. Compounds of the present invention which possess outstanding utility in the aforesaid respects are those in which X represents a cyano group and Z represents a piperidino radical substituted in the 4-position by a hydroxy, hydroxymethyl, hydroxyethyl, or acetyloxy group. Individual compounds of importance are 3-cyano-10-[3-(4 - hydroxymethyl-1-piperidyl)propyl]phenthiazine, 3-cyano - 10 - [3-(4-hydroxy-1-piperidyl)propyl] phenthiazine, 3-cyano-10-[3-(4-hydroxethyl-1-piperidyl)propyl]phenthiazine, 3-cyano-10-[3-(4-acetyloxy - 1-piperdyl)propyl]phenthiazine and 3-cyano-10-[2-methyl-3 - (4-hydroxy - 1 - piperidyl)propyl]phenthiazine.

For therapeutic purposes, the bases of general Formula I are preferably employed as such or in the form of non-toxic acid addition salts i.e. salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. However, they may also be employed in the form of non-toxic quaternary ammonium salts obtained by reaction with organic halides (e.g. methyl or ethyl iodide, chloride or bromide or allyl or benzyl chloride or bromide) or other reactive esters, e.g. toluene-p-sulphonates.

The invention is illustrated by the following examples.

*Example I*

A solution of 3-cyano-10-(3-toluene-p-sulphonyloxypropyl)phenthiazine (12.5 g.) and 4-piperidylmethanol (6.6 g.) in toluene (150 cc.) is heated under reflux for 3 hours. After cooling, the basic products are extracted by agitation with water (70 cc.) and methanesulphonic acid (25 cc.). The aqueous acid phase is made alkaline with aqueous sodium hydroxide (d.=1.33, 40 cc.) and the liberated base is extracted with chloroform. The chloroform phase is washed with water and dried over anhydrous potassium carbonate and the solvent is removed at atmospheric pressure.

The oily residue is treated with benzene (200 cc.) and the solvent is distilled until the volume is reduced to 120 cc. The solution thus obtained is filtered through a column of chromatographic alumina (200 g.) and eluted successively with benzene and a mixture (7:3) of benzene and ethyl acetate. On evaporation of the solvent and recrystallisation of the solid residue from a mixture (1:2) of benzene and cyclohexane there is obtained 3 - cyano - 10 - [3 - (4 - hydroxymethyl - 1 - piperidyl)-propyl]phenthiazine (7.7 g.) as a yellow crystalline powder, M.P. 123–124° C.

The initial 4-piperidylmethanol is prepared according to the method of Clemo et al., J. Chem. Soc., 1523 (1937).

*Example II*

A solution of 3-cyano-10-(3-toluene-p-sulphonyloxypropyl)phenthiazine (30.7 g.) and 2-piperidylmethanol (16.2 g.) in toluene (350 cc.) is heated under reflux for 4 hours. It is then treated as in Example I and the crude base is purified in solution in benzene (500 cc.) by chromatography over a column of alumina (500 g.) by successive elution with benzene and a mixture (7:3) of benzene and ethyl acetate. After evaporation of the eluting solvent, a purified base (27.5 g.) is obtained which is converted in acetone to the hydrochloride by the addition of ethereal hydrogen chloride. After recrystallisation from n-propanol there is obtained the hydrochloride of 3 - cyano - 10 - [3 - (2 - hydroxymethyl - 1 - piperidyl)propyl]phenthiazine (24.9 g.) as a creamy-white crystalline powder, M.P. 219–221° C. (decomp.).

The initial 2-piperidylmethanol is prepared according to the method of Adkins et al., J. Amer. Chem. Soc., 69, 3039 (1947).

*Example III*

A solution of 3-cyano-10-(3-toluene-p-sulphonyloxypropyl)phenthiazine (30.7 g.) and 3-piperidylmethanol (16.2 g.) in toluene (350 cc.) is heated under reflux for 3 hours. It is then treated as in Example I and the crude base, dissolved in benzene (700 cc.), is purified by chromatography over a column of alumina (350 g.) by successive elution with benzene (350 cc.), a mixture (9:1) of benzene and ethyl acetate (500 cc.), a mixture (1:1) of benzene and ethyl acetate (500 cc.) and ethyl acetate (800 cc.). After evaporation of the solvent from the various fractions a total of 25.5 g. of purified base is obtained which is converted into the hydrochloride in acetone by the addition of ethereal hydrogen chloride. After recrystallisation from ethanol there is obtained the hydrochloride of 3-cyano-10-[3-(3-hydroxymethyl-1-piperidyl)propyl]phenthiazine (21.8 g.) as a creamy-white crystalline powder, M.P. 200–205° C. (decomp.).

The initial 3-piperidylmethanol is prepared according to the method of Sandborn et al., J. Amer. Chem. Soc., 50, 565 (1928).

*Example IV*

3 - cyano - 10 - [3 - (4 - hydroxymethyl - 1 - piperidyl)-propyl]phenthiazine (10 g.), prepared as in Example I, is dissolved in anhydrous toluene (175 cc.), the solution is maintained at 55° C. and a solution of sodium methoxide, prepared from sodium (0.62 g.) and methanol (10 cc.), is added over 5 minutes. The mixture is then heated to boiling and part of the solvent is distilled off until the boiling point of pure toluene is reached. Dimethylcarbamyl chloride (3.22 g.) is then run in over 5 minutes and the mixture is heated under reflux for 1½ hours. It is then cooled to 40° C. and the toluene phase is washed with water (125 cc. in 4 lots), dried over anhydrous sodium sulphate and concentrated to dryness under a pressure of 20 mm. Hg with heating to 100° C. The oily residue is dissolved in benzene (300 cc.) and the solution is filtered through a column of chromatographic alumina (150 g.) and eluted successively with benzene (100 cc.), and a mixture (1:1) of benzene and ethyl acetate (375 cc.). After concentration to dryness of the various elution fractions, a total of 4.2 g. of purified base is obtained which is converted to the oxalate in acetone. After recrystallisation from ethanol there is obtained the acid oxalate of 3-cyano-10-[3-(4-dimethylcarbamoyloxymethyl - 1 - piperidyl)propyl]phenthiazine (5 g.) as a creamy-yellow crystalline powder, M.P. 162–164° C.

*Example V*

A solution of 3-cyano-10-(3-toluene-p-sulphonyloxypropyl)phenthiazine (10.9 g) and 4-piperidinol (5 g.) in toluene (80 cc.) is heated under reflux for 4 hours. After cooling, the basic products are extracted by agitation with water (50 cc.) and 4 N hydrochloric acid (10 cc.). The aqueous acid phase is made alkaline with 4 N sodium hydroxide (20 cc.) and the liberated base is extracted with ethyl acetate (125 cc.). The organic phase is dried over anhydrous potassium carbonate and concentrated to dryness. After recrystallisation of the solid residue from ethyl acetate there is obtained 3-cyano-10-[3-(4-hydroxy-1-piperidyl)propyl]phenthiazine (6.8 g.) as a yellow crystalline powder, M.C. 116–117° C.

The initial 4-piperidinol is prepared according to the method of Emmert et al., Ber., 48, 688 (1915).

*Example VI*

A solution of 3-cyano-10-(3-toluene-p-sulphonyloxypropyl)phenthiazine (6.95 g.) and 3-piperidinol (3.2 g.) in toluene (55 cc.) is heated under reflux for 6 hours and treated as in Example V. The crude base is converted into a maleate in ethyl acetate. After recrystallisation from ethanol there is obtained the acid maleate of 3-cyano - 10 - [3 - (3-hydroxy - 1 - piperidyl)propyl]phenthiazine (5.1 g.) as a pale yellow crystalline powder, M.P. 138–140° C. (decomp.).

The initial 3-piperidinol is prepared according to the method of Biel et al., J. Amer. Chem. Soc., 74, 1485 (1952).

*Example VII*

A solution of 3-cyano-10-(3-toluene-p-sulphonyloxypropyl)phenthiazine (3.7 g.), 3-piperidylethanol (1.1 g.) and pyridine (0.67 g.) in toluene (50 cc.) is heated under reflux for 3 hours. After cooling, the basic products are extracted with 4 N hydrochloric acid (20 cc. followed by 2 x 5 cc.). The aqueous acid phase is made alkaline with aqueous sodium hydroxide (d.=1.33; 20 cc.), the liberated base is extracted with chloroform, the organic phase is dried over potassium carbonate and the solvent is removed under pressure of 20 mm. Hg.

The oily residue is dissolved in benzene (120 cc.) and the solution is filtered over a column of chromatographic alumina (60 g.). It is then eluted successively with benzene (200 cc.) and ethyl acetate (500 cc.). On evaporation of the solvent, the purified base (1.85 g.) is isolated and converted into the hydrochloride in acetone by the addition of ethereal hydrogen chloride. After recrystallisation from n-propanol, there is obtained the hydrochloride of 3 - cyano -10 - [3 - (3 - hydroxyethyl - 1-piperidyl)propyl]phenthiazine (1.4 g.) as a creamy-white crystalline powder, M.P. about 183–190° C. (decomp.).

The initial 3-piperidylethanol is prepared according to the method of Paul et al., Bull. Soc. Chim. France, 1139 (1954).

*Example VIII*

A solution of 3-cyano-10-(3-toluene-p-sulphonyloxypropyl)phenthiazine (7.9 g.) and 4-piperidylethanol (5 g.) in anhydrous toluene (60 cc.) is heated under reflux for 4 hours. After cooling, the basic components are extracted with N methanesulphonic acid (30 cc.) and then with water (2 x 20 cc.). The aqueous acid phase is made alkaline with aqueous sodium hydroxide (d.=1.33, 10 cc.) and the liberated base is extracted with benzene (3 x 25 cc.). The benzene phase is washed with water (3 x 20 cc.) and dried over anhydrous potassium carbonate and the solvent is removed on the water-bath under a pressure of 20 mm. Hg.

The oily residue (6.5 g.) is dissolved in benzene (100 cc.) and the solution obtained is filtered through a column of chromatographic alumina (70 g.). It is then eluted successively with benzene (900 cc.), a mixture (20:1) of benzene and ethyl acetate (400 cc.), a mixture (10:1) of benzene and ethyl acetate (400 cc.) and a mixture (3:1) of benzene and ethyl acetate (800 cc.). On evaporation of the various fractions the purified base (5 g.) is isolated which is converted into the acid oxalate in acetone. After recrystallisation from ethanol there is obtained the acid oxalate of 3-cyano-10-[3-(4-hydroxyethyl-1-piperidyl)propyl]phenthiazine (4.5 g.) as a yellow crystalline powder, M.P. about 145° C.

The initial 4-piperidylethanol is prepared according to the method of Malan et al., J. Amer. Chem. Soc., 69, 1797 (1947).

*Example IX*

A solution of 3-cyano-10-(3-toluene-p-sulphonyloxypropyl)phenthiazine (6.5 g.), 2-hydroxymethylpyrrolidine (1.5 g.) and pyridine (1.2 g.) in anhydrous toluene (50 cc.) is heated under reflux for 4 hours. As in the previous examples the basic products are extracted with hydrochloric acid, the base is liberated by the addition of sodium hydroxide and extracted with chloroform, and the solution is dried.

The chloroform solution is diluted to a volume of 300 cc., filtered through a column of chromatographic alumina (150 g.) and eluted with chloroform. On evaporation of the solvent, purified base (2.6 g.) is obtained which is recrystallised from cyclohexane. There is thus obtained 3-cyano-10-[3-(2-hydroxymethyl-1-pyrrolidyl)propyl]phenthiazine (1.8 g.) as a yellow crystalline product, M.P. 121–124° C.

*Example X*

A mixture of 3-cyano-10-[3-(4-hydroxy-1-piperidyl)propyl]phenthiazine (7.3 g.), acetic anhydride (12.3 g.) and anhydrous pyridine (85 cc.) is heated under reflux for 4 hours. After cooling, the solvents are removed under a pressure of 10 mm. Hg, the residue being heated to 90° C. at the end of the concentration.

The residue is dissolved in ethyl acetate (100 cc.) and the solution is washed with an aqueous solution of potassium carbonate (10 g. in 100 cc.), and then with water. The organic phase is dried over anhydrous potassium carbonate and evaporated to dryness under a final pressure of 1 mm. Hg, the residue being heated to 130° C. at the end of the concentration.

The residue (8.1 g.) is then dissolved in pure benzene (100 cc.) and the solution is filtered through a column of chromatographic alumina (150 g.). It is then eluted successively with benzene and a mixture (19:1) of benzene and ethyl acetate. After evaporation of the solvent, the purified base is recrystallised from isopropyl ether and there is thus obtained 3-cyano-10-[3-(4-acetyloxy-1-piperidyl)propyl]phenthiazine (5.3 g.) as a yellow crystalline powder, M.P. 105–106° C.

*Example XI*

A solution of 3-cyano-10-[3-(4-hydroxy-1-piperidyl)propyl]phenthiazine (7.3 g.) and 3:4:5-trimethoxybenzoyl chloride (4.6 g.) in anhydrous toluene (100 cc.) is heated under reflux for 3 hours.

After cooling, the reaction mixture is extracted with N sulphuric acid and the acid phase is washed with ethyl acetate. It is then made alkaline with a saturated aqueous solution of potassium carbonate (30 cc.) and the liberated base is extracted with ethyl acetate. The organic phase is dried over anhydrous potassium carbonate and the solvent is removed under a pressure of 15 mm. Hg with heating to 100° C.

The oily residue is dissolved in pure benzene (200 cc.) and the solution is filtered through a column of chromatographic alumina (150 g.). After elution with benzene and evaporation of the solvent, the purified base is recrystallised from ethyl acetate. There is thus obtained 3-cyano-10-[3-(4-3':4':5'-trimethoxybenzoyloxy-1 - piperidyl)propyl]phenthiazine (4.3 g.) as a yellow crystalline powder, M.P. 134–135° C.

*Example XII*

A solution of methyl isocyanate (3.9 g.) in benzene (30 cc.) is run into a fine suspension of 3-cyano-10-[3-(4-hydroxymethyl-1 - piperidyl)propyl]phenthiazine (7.5 g.) in benzene (120 cc.) the temperature being maintained at about 10° C. The temperature is then maintained at about 10° C. for 1 hour and then at 20° C. for 20 hours and the mixture is finally heated under reflux for 1 hour.

After cooling, the reaction mixture is concentrated to a volume of 100 cc. and insoluble matter comprising unreacted starting material is filtered off.

The benzene solution thus obtained in filtered through a column of chromatographic alumina (100 g.) and eluted successively with benzene, a mixture (9:1) of benzene and ethyl acetate and a mixture (1:1) of benzene and ethyl acetate. On evaporation of the solvent, the purified base (4.1 g.) is obtained which is converted into its oxalate in acetone. After recrystallisation from ethanol there is obtained the acid oxalate of 3-cyano-10-[3-(4-methylcarbamoyloxymethyl - 1 - piperidyl)propyl]phenthiazine as a yellow crystalline powder, M.P. 170–172° C.

*Example XIII*

A solution of 3-cyano-10-(3-toluene-p-sulphonyloxypropyl)phenthiazine 9(.57 g.) and 2-(3-hydroxypropyl)-piperidine (3.14 g.) in anhydrous toluene (250 cc.) is heated under reuflx for 5 hours.

After cooling, the basic components are extracted with 4 N hydrochloric acid (80 cc. in 4 lots) and toluene solution is washed with water (2 x 100 cc.). The combined aqueous acid phases are made alkaline with aqueous sodium hydroxide (d.=1.33) and the liberated base is extracted with chloroform. The organic phase is dried with anhydrous potassium carbonate and the solvent is removed on the water-bath under a pressure of 20 mm. Hg.

The base obtained is converted into the hydrochloride in acetone by the addition of ethereal hydrogen chloride. After recrystallisation from isopropanol there is obtained the hydrochloride of 3-cyano-10-[3-(2-3'-hydroxypropyl-1-piperidyl)propyl]phenthiazine as a yellow crystalline powder, M.P. 174–178° C.

Example XIV

A solution of 3-cyano-10-(2-methyl-3-chloropropyl)-phenthiazine (13.5 g.) and 4-hydroxypiperidine (7 g.) in anhydrous xylene (15 cc.) is heated under reflux for 22 hours.

After cooling, the basic products are extracted by diluting the reaction mixture with ether (25 cc.) and agitating with water (25 cc.) and 4 N hydrochloric acid (20 cc.). The aqueous acid phase is made alkaline with 4 N sodium hydroxide (25 cc.) and the liberated base is extracted with chloroform (100 cc.). The chloroform phase is dried over anhydrous potassium carbonate and the solvent is removed on the water-bath under a pressure of 20 mm. Hg.

The residue is dissolved in pure benzene (300 cc.) and the solution is filtered through a column of chromatographic alumina (150 g.). On elution with benzene and concentration to dryness of the various elution fractions the purified base (7 g.) is obtained. After recrystallisation from acetonitrile, there is obtained 3-cyano-10-[2-methyl-3-(4-hydroxy-1-piperidyl) propyl]-phenthiazine as a pale yellow crystalline powder, M.P. 134–135° C.

Example XV

3(3-dimethylsulphamoyl-10-phenthiazinyl)propyl toluene-p-sulphonate (4.5 g.) and 4-hydroxymethylpiperidine (1.9 g.) in toluene (50 cc.) are heated under reflux for 4 hours. The mixture is then agitated with N methanesulphonic acid (17 cc. followed by 5 cc.) and, after decantation, and washing with benzene, the base is liberated with a saturated solution of potassium carbonate (15 cc.) and extracted with chloroform (30 cc. followed by 20 cc.).

The chloroform solution is concentrated, dissolved in benzene (40 cc.) and purified by chromatography through an alumina column. After elution with mixtures of benzene and ethyl acetate there is obtained 3-dimethysulphamoyl - 10 - [3 - (4 - hydroxymethyl - 1 - piperidyl)-propyl]phenthiazine (1.55 g.) in the form of a pale yellow resin. The hydrochloride, prepared in a mixture of isopropanol and ether, melts at 160° C.

Proceeding as above, the following products are prepared:

3-methyl-10-[3-(4-hydroxymethyl-1-piperidyl)propyl]phenthiazine
3-methoxy-10-[3-(4-hydroxymethyl-1-piperidyl)propyl]phenthiazine
3-methylthio-10-[3-(4-hydroxymethyl-1-piperidyl)-propyl]phenthiazine
3-methanesulphonyl-10-[3-(4-hydroxymethyl-1-piperidyl)propyl]phenthiazine
3-trifluoromethyl-10-[3-(4-hydroxymethyl-1-piperidyl)-propyl]phenthiazine.

Example XVI

A solution of 3-methoxy-10-(3-toluene-p-sulphonyloxypropyl)phenthiazine (18.4 g.) and 4-hydroxypiperidine (5.27 g.) in toluene (150 cc.) is heated under reflux for 5 hours. After cooling, the mixture is diluted with ethyl acetate (100 cc.) and the basic products are extracted by agitation with 0.5 N hydrochloric acid (120 cc.) and then with water (50 cc.). The aqueous acid phase is made alkaline with a saturated aqueous solution of potassium carbonate (20 cc.) and the liberated base is extracted with chloroform. The chloroform solution is dried with sodium sulphate and the solvent is evaporated under a pressure of 30 mm. Hg with warming to 70° C.

The oily residue is redissolved in chloroform (200 cc.) and the solution obtained is filtered through a column of chromatographic alumina (150 g.). The base is eluted successively with chloroform, and a mixture (9:1) of chloroform and ethyl acetate. On evaporation of the solvent a purified base (8.2 g.) is obtained. After recrystallisation twice from acetonitrile there is obtained 3-methoxy-10-[3-(4 - hydroxy - 1 - piperidyl)propyl]phenthiazine as a white crystalline powder, M.P. 99–101° C.

Example XVII

A solution of 3-methoxy-10-(3-chloro-2-methylpropyl)-phenthiazine (9.65 g.) and 4-hydroxypiperidine (6.1 g.) in xylene (10 cc.) is heated under reflux for 5 hours. After cooling the mixture is diluted with ether (60 cc.) and the basic compounds are extracted by agitation with water (30 cc.) and 4 N hydrochloric acid (20 cc.). The aqueous acid phase is made alkaline with 4 N sodium hydroxide solution (23 cc.) and the liberated base is extracted with ether. The ethereal solution is washed with water (60 cc.) and dried over sodium sulphate. Finally the solvent is distilled off on a water-bath.

The solid residue obtained is recrystallised from a mixture (15:85) of benzene and cyclohexane and there is obtained 3-methoxy-10-[2-methyl-3-(4-hydroxy-1-piperidyl)-propyl]phenthiazine (5.7 g.) as a white crystalline powder, M.P. 137–138° C.

Example XVIII

A solution of 3-methoxy-10-(3-chloro-2-methylpropyl)-phenthiazine (12.8 g.) and 4-piperidylmethanol (9.2 g.) in xylene (15 cc.) is heated under reflux for 6 hours. After cooling the mixture is diluted with ether (115 cc.), and the basic products are extracted by agitation with water (70 cc.) and 4 N hydrochloric acid (25 cc.). The aqueous layer is separated and the ethereal phase is extracted with water (150 cc.) and 4N hydrochloric acid (15 cc.) in three portions. The united acid extracts are washed three times with ether (50 cc.) and made alkaline with 4 N sodium hydroxide solution (50 cc.). The liberated base is extracted with ether, the ethereal solution is dried over sodium sulphate, and the solvent is distilled off on a water bath under a pressure of 30 mm. Hg.

The oily residue is dissolved in a mixture (1:3) of benzene and cyclohexane (200 cc.) and the solution is filtered through a column of chromatographic alumina (100 g.). The base is eluted successively with a mixture (1:3) of benzene and cyclohexane, and a mixture (1:1) of benzene and cyclohexane. After evaporation of the eluates and recrystallisation of the residue from acetonitrile, there is obtained 3-methoxy-10-[2-methyl-3-(4-hydroxymethyl-1-piperidyl)propyl]phenthiazine as a white crystalline powder, M.P. 85–87° C.

The present invention includes within its scope pharmaceutical compositions comprising one or more of the compounds of Formula I, or an acid addition or quaternary salt thereof, and a significant amount of a pharmaceutical carrier which may be either a solid material or a liquid. In clinical practice the compounds of the present invention will normally be administered orally, in consequence of which the preferred formulations are those of the kind suitable for oral administration.

Preparations for oral ingestion can be liquids or solids or any combination of these forms, such as solutions, suspensions, syrups elixirs, emulsions, powders or tablets. Pharmaceutical preparations for administration of the active therapeutic agents in unit dose form can take the form of compressed powders (or tablets) or of a powder enclosed in a suitable capsule of absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put up in powder packets and employed as such.

Preparations for parenteral administration may be sterile solutions or suspensions in water or other liquids, with or without the addition of soluble or insoluble diluents and/or solid or liquid excipients.

The percentage of active ingredient in the compositions of the invention may be varied, it being necessary that it should constitute a proportion such that a suitable dosage shall be obtained. Obviously several unit dosage forms may be administered at about the same time.

An illustrative example of a pharmaceutical preparation of the invention will now be given.

*Example XIX*

There are prepared tablets weighing approximately 140 mg. and having the following composition:

|  | Mg. |
|---|---|
| 3-cyano-10-[3-(4-hydroxyethyl-1-piperidyl)propyl]-phenthiazine | 5 |
| Starch | 100 |
| Colloidal silica | 32 |
| Magnesium stearate | 3 |

These tablets can be administered to patients, the usual daily dose being from 5 to 20 mg.

We claim:
A compound selected from the class consisting of 3-cyano-10-[3 - (4-hydroxy-1-piperidyl)propyl]phenthiazine and its non-toxic acid addition and quaternary ammonium salts.

References Cited in the file of this patent

UNITED STATES PATENTS

| 2,272,498 | Zerweck | Feb. 10, 1942 |
| 2,512,520 | Cusic | June 20, 1950 |
| 2,534,237 | Cusic | Dec 19, 1950 |
| 2,676,971 | Cusic | Apr. 27, 1954 |
| 2,766,235 | Cusic | Oct. 6, 1956 |
| 2,789,978 | Rath | Apr. 23, 1957 |
| 2,838,505 | Zenitz | June 10, 1958 |
| 2,921,069 | Ullyot | Jan. 12, 1960 |
| 2,926,164 | Cusic et al. | Feb. 23, 1960 |
| 2,928,767 | Gulesich et al. | Mar. 15, 1960 |
| 2,931,810 | Yale et al. | Apr. 5, 1960 |

FOREIGN PATENTS

| 552,557 | Belgium | May 13, 1957 |

OTHER REFERENCES

Craig et al.: J. Org. Chem., vol. 22, pp. 709–711 (June 1957).

Schmitt: Compt. rendu 244, pp. 255–258 (January 1957).

Delay: Chem. Abst., vol. 52, p. 18899, November 10, 1958.